(12) United States Patent
Özer et al.

(10) Patent No.: US 8,037,287 B2
(45) Date of Patent: Oct. 11, 2011

(54) ERROR RECOVERY FOLLOWING SPECULATIVE EXECUTION WITH AN INSTRUCTION PROCESSING PIPELINE

(75) Inventors: Emre Özer, Cambridge (GB); Shidhartha Das, Cambridge (GB); David Michael Bull, Cambridge (GB)

(73) Assignee: ARM Limited, Cambridge (GB)

( * ) Notice: Subject to any disclaimer, the term of this patent is extended or adjusted under 35 U.S.C. 154(b) by 717 days.

(21) Appl. No.: 12/076,165

(22) Filed: Mar. 14, 2008

(65) Prior Publication Data
US 2008/0250271 A1 Oct. 9, 2008

(30) Foreign Application Priority Data

Apr. 3, 2007 (GB) .................................. 0706489.2

(51) Int. Cl.
*G06F 9/30* (2006.01)
(52) U.S. Cl. ........................................ 712/219; 712/220
(58) Field of Classification Search ........................ None
See application file for complete search history.

(56) References Cited

U.S. PATENT DOCUMENTS

| | | | |
|---|---|---|---|
| 6,108,794 A | | 8/2000 | Erickson |
| 6,212,544 B1 * | | 4/2001 | Borkenhagen et al. ........ 718/103 |
| 6,625,756 B1 * | | 9/2003 | Grochowski et al. ............ 714/17 |
| 6,694,425 B1 | | 2/2004 | Eickemeyer |
| 6,931,639 B1 * | | 8/2005 | Eickemeyer .................. 718/104 |
| 7,398,377 B2 * | | 7/2008 | McDonald et al. ............ 712/238 |
| 7,512,772 B2 * | | 3/2009 | Gschwind et al. ............. 712/227 |
| 2002/0043989 A1 | | 4/2002 | Hugues et al. |
| 2004/0216105 A1 * | | 10/2004 | Burky et al. .................. 718/100 |
| 2004/0243893 A1 * | | 12/2004 | Mudge et al. ................. 714/724 |
| 2005/0097304 A1 | | 5/2005 | Luick |
| 2005/0108711 A1 * | | 5/2005 | Arnold et al. ................. 718/100 |
| 2006/0004989 A1 | | 1/2006 | Golla |
| 2006/0184769 A1 * | | 8/2006 | Floyd et al. .................... 712/216 |

(Continued)

FOREIGN PATENT DOCUMENTS

WO    WO 2004/084072    9/2004

(Continued)

OTHER PUBLICATIONS

Great Britain Search Report dated Jun. 6, 2007.

(Continued)

*Primary Examiner* — Idriss N Alrobaye
(74) *Attorney, Agent, or Firm* — Nixon & Vanderhye P.C.

(57) ABSTRACT

An instruction processing pipeline 6 is provided. This has error detection and error recovery circuitry 20 associated with one or more of the pipeline stages. If an error is detected within a signal value within that pipeline stage, then it can be repaired. Part of the error recovery may be to flush upstream program instructions from the instruction pipeline 6. When multi-threading, only those instructions from a thread including an instruction which has been lost as a consequence of the error recovery need to be flushed from the instruction pipeline 6. Instruction can also be selected for flushing in dependence upon characteristics such as privileged level, number of dependent instructions etc. The instruction pipeline may additionally/alternatively be provided with more than one main storage element 26, 28 associated with each signal value with these main storage elements 26, 28 being used in an alternating fashion such that if a signal value has been erroneously captured and needs to be repaired, there is still available a main storage element 26, 28 to properly capture the signal value corresponding to the following program instruction. In this way flushes can be avoided.

19 Claims, 7 Drawing Sheets

U.S. PATENT DOCUMENTS

| | | |
|---|---|---|
| 2006/0184852 A1 | 8/2006 | Chu et al. |
| 2006/0190702 A1* | 8/2006 | Harter et al. .................... 712/15 |
| 2006/0220716 A1 | 10/2006 | Nicolaidis |
| 2006/0282829 A1 | 12/2006 | McIlvaine et al. |
| 2007/0124568 A1* | 5/2007 | Kra ............................... 712/226 |
| 2007/0288726 A1* | 12/2007 | Luick ............................ 712/225 |
| 2008/0163010 A1* | 7/2008 | Racunas et al. ............... 714/699 |
| 2008/0276075 A1* | 11/2008 | Luick ............................ 712/216 |

FOREIGN PATENT DOCUMENTS

| | | |
|---|---|---|
| WO | 2006/083542 | 8/2006 |
| WO | WO 2006/115474 | 11/2006 |

OTHER PUBLICATIONS

UK Combined Search and Examination Report dated Jul. 22, 2011 for GB 1111036.8.

\* cited by examiner

| Cycle | F | D | I | E | WB |
|---|---|---|---|---|---|
| t | $I_n T0$ | $I_{n-1} T1$ | $I_{n-2} T0$ | $I_{n-3} T1$ | $I_{n-4} T0$ |
| t+1 | $I_{n+1} T1$ | $I_n T0$ | $I_{n-1} T1$ | $I_{n-2} T0$ | $I_{n-3} T1$ |
| t+2 | $I_{n+2} T0$ | $I_{n+1} T1$ | $I_n T0$ | $I_{n-1} T1$ | $I_{n-2} T0$ |
| t+3 | $I_{n+3} T1$ | $I_{n+2} T0$ | $I_{n+1} T1$ | $I_n T0$ | $I_{n-1} T1$ |
| ⋮ | ⋮ | ⋮ | ⋮ | ⋮ | ⋮ |

ERROR RECOVERY FOLLOWING SPECULATIVE EXECUTION WITH AN INSTRUCTION PROCESSING PIPELINE

BACKGROUND OF THE INVENTION

This application claims priority to Great Britain Application No. 0706489.2 filed 3 Apr. 2007, the entire contents of which are hereby incorporated by reference.

1. Field of the Invention

The present invention relates to the field of data processing systems. More particularly, the present invention relates to data processing systems using speculative execution with error recovery mechanisms within instruction processing pipelines.

2. Description of the Prior Art

It is known within systems such as that described in WO-2004/084072 to provide data processing systems with instruction processing pipelines that perform speculative execution based upon processed signal values using the assumption that those signal values are correct and then provide error recovery mechanisms which serve subsequently to detect if the signal values concerned were incorrect and initiate appropriate error recovery actions. These techniques are useful in allowing the data processing system to execute closer to its operational limits (e.g. closer to its maximum clock rate or minimum operating voltage) and thereby achieve improved performance/efficiency whilst maintaining reliability due to the in-built error detection and recovery mechanisms.

A typical error recovery mechanism within these systems for an instruction processing pipeline involves flushing of instructions from the pipeline and reloading the pipeline starting from the erring instruction to try to achieve correct operation. Such pipeline flushing interrupts the normal processing flow and reduces the data processing throughput in a disadvantageous manner. Further advantage can be achieved with the above described techniques if the penalty associated with the occurrence and recovery from an error can be reduced.

SUMMARY OF THE INVENTION

Viewed from one aspect the present invention provides apparatus for processing data comprising:

an instruction processing pipeline having a plurality of pipeline stages;

at least one error detector coupled to a pipeline stage of said instruction processing pipeline and responsive to at least one signal value within said pipeline stage to detect a processing error associated with an erring program instruction within said pipeline stage;

error recovery circuitry coupled to said at least one error detector and responsive to detection of a processing error by said error detector to initiate an error recovery operation as a consequence of which at least one program instruction being processed in said instruction processing pipeline becomes a lost program instruction for which at least some state is lost and processing cannot continue; and a flush controller coupled to said at least one error detector and responsive to detection of a processing error by said error detector to selectively flush from said instruction processing pipeline one or more subsequent program instructions dependent upon said lost program instruction while program instructions independent of said lost program instruction are retained for further processing in said instruction processing pipeline.

The present technique recognises that not all of the instructions following the erring (lost) instruction need be flushed. Flushing of instructions dependent upon the erring instruction may be sufficient. The dependency can take a wide variety of different forms such as data dependency, control dependency (e.g. branch dependent) and thread dependency (e.g. belonging to the same thread). Flushing fewer instructions reduces the performance impact of the error.

More particularly, the present technique recognises that when a speculative execution with error detection and error recovery technique is combined with multi-threaded processing there arises the possibility of advantageously reducing the penalty associated with error recovery. More particularly, the technique recognises that whilst an error may have occurred causing loss of an instruction within one program thread, and an associated need to flush the instructions for that program thread, the program instructions for other program threads present within the instruction processing pipeline can be allowed to continue their processing within the instruction processing pipeline without flushing. This advantageously reduces the penalty associated with error recovery with a relatively small increase in control complexity/logic.

The program instruction for which the error occurs may or may not be the program instruction which is lost as part of the error recovery operation. In some embodiments the erring instruction will be discarded and program instructions within the same program thread as the erring instruction will be flushed. The following instruction would be allowed to continue and other instructions within its program thread would be similarly allowed to continue. As an alternative, an error may be detected within an erring instruction and an error recovery operation performed to replace the incorrect signal with a correct signal with a repair operation having the consequence that an immediately following instruction is lost even though it did not have an error in its execution. In this case it would be that following instructions and instructions within the thread of that following instruction which are flushed and reissued into the instruction processing pipeline. The following instruction can be considered to be a "scapegoat" instruction for the instruction in which the error occurred.

It will be appreciated that the present technique could be applied to systems having any number of threads of program execution executed in parallel and that the reduction of the error recovery penalty due to flushing of a single thread is smaller when that single thread represents a lower proportion of the "in-flight" instructions. However, in practice the number of parallel threads which can usefully be executed at the same time is limited in most situations to a relatively small number of perhaps two or three and thereafter it becomes increasingly difficult to isolate program threads for independent execution within an instruction pipeline. Accordingly, the present technique is likely to be used with interleaved program instructions coming from two threads, although it would be possible for the interleaved instructions to come from more than two threads. It will also be appreciated that the multi-threading can be achieved at a variety of different levels. It may be that the threads represent different application programs and their parallel execution is controlled at an operating system level. Alternatively, the threads can be created from the same application through compiler or at run time.

The technique is equally applicable to in-order as well as out-of-order superscalar architectures having more than one instruction pipeline into which program instructions can be issued, as well as scalar systems having a single instruction pipeline.

In the context of the nature of the program threads, the present technique is well suited to systems in which there is a high priority program thread and a low priority program thread with the thread control circuitry supplying program instruction from these two threads in an alternating sequence. In such a scenario, the low priority thread can be arranged to be the scapegoat thread for errors occurring within the high priority thread. The error correction and error recovery may also be controlled to dynamically select which instructions are to be lost during the error recovery operation such that if the error occurs within the low priority thread, then it is the instructions of the low priority thread that are lost and if the error occurs within the high priority thread, then it is still the instructions of the low priority thread which are lost.

Whilst it will be appreciated that the error detection and error recovery circuitry can take a wide variety of different forms, it is efficient for these to be provided using a main storage element (e.g. a latch, a flip-flop or the like) within the pipeline stage and a shadow storage element for sampling the signal value at a later time after expiry of the speculative execution window together with a comparator for detecting any difference in the stored values as indicative of a processing error. With this arrangement, the correct value within the shadow storage element can be used to replace the incorrect value within the main storage element as part of the error recovery action.

Viewed from another aspect the present invention provides apparatus for processing data comprising:

instruction processing pipeline means for processing instructions and having a plurality of pipeline stages;

at least one error detector means coupled to a pipeline stage of said instruction processing pipeline means and responsive to at least one signal value within said pipeline stage for detecting a processing error associated with an erring program instruction within said pipeline stage;

error recovery means coupled to said at least one error detector means and responsive to detection of a processing error by said error detector means for initiating an error recovery operation as a consequence of which at least one program instruction being processed in said instruction processing pipeline means becomes a lost program instruction for which at least some state is lost and processing cannot continue; and flush controller means coupled to said at least one error detector means and responsive to detection of a processing error by said error detector means to selectively flush from said instruction processing pipeline means one or more subsequent program instructions dependent upon said lost program instruction while program instructions independent of said lost program instruction are retained for further processing in said instruction processing pipeline means.

Viewed from a further aspect the present invention provides a method for processing data comprising:

processing program instructions within an instruction processing pipeline having a plurality of pipeline stages;

in response to at least one signal value within a pipeline stage of said instruction processing pipeline, detecting a processing error associated with an erring program instruction within said pipeline stage;

in response to detection of said processing error, initiating an error recovery operation as a consequence of which at least one program instruction being processed in said instruction processing pipeline becomes a lost program instruction for which at least some state is lost and processing cannot continue; and in response to detection of a processing error selectively flushing from said instruction processing pipeline one or more subsequent program instructions from a common program thread with said lost program instruction while program instructions of one or more other program threads are retained for further processing in said instruction processing pipeline.

Viewed from a further aspect the present invention provides apparatus for processing data comprising:

an instruction processing pipeline having a plurality of pipeline stages;

at least one error detector coupled to a pipeline stage of said instruction processing pipeline and responsive to at least one signal value within said pipeline stage to detect a processing error associated with an erring program instruction within said pipeline stage; and error recovery circuitry coupled to said at least one error detector and responsive to detection of a processing error by said error detector to initiate an error recovery operation; wherein said pipeline stage includes a first main storage element and a second main storage element for sampling a signal for respective program instructions at respective operational sampling points in an alternating sequence; and said error recovery operation includes replacing an incorrect signal value stored in one of said first main storage element or said second main storage element with a correct value subsequent to said operational sampling point while a signal value for a following program instruction remains stored in an other of said first main storage element or said second main storage element.

As discussed above, it will be appreciated that depending upon the error recovery mechanism employed with the conventional techniques having a single main storage element within the instruction pipeline it can either be the erring instruction itself which is lost or the following instruction. The need to flush the instruction pipeline can be avoided at the expense of an increase in circuit overhead if the instruction pipeline is provided with a first main storage element and a second main storage element for sampling signals progressing along that pipeline stage at respective operational sampling points in an alternating sequence. In this way, an error detected within an erring instruction can be repaired by replacing the incorrect value within the main storage element which captured that incorrect signal value whilst the following instruction is using the other of the main storage elements which is provided as a target for the signal value it is calculating. The pipeline may need to be stopped to allow for the recovery operation to be performed and then the corrected value re-launched into the following pipeline stage, but the need to flush program instructions may be avoided since the erring instruction will have been repaired and the following instruction will have been allowed to correctly execute and store its signal value in the other of the main storage elements provided.

The two main storage elements can share a shadow storage element used to sample the signal value subsequent to the operational sampling point and a comparator for detecting any difference between the values within the main storage element and the shadow storage element. It will be seen that in this case the shadow storage element and the comparator are active for every processing cycle when a signal value is captured whereas the main storage elements provided are used in alternating sequence in order to give the required level of redundancy to ensure a target for a signal value being calculated.

It will be appreciated that this technique can be used to good effect with single threaded sequences of program instructions, but is also applicable within multi-threaded systems. Within such multi-threaded systems the interleaved stream of processing instructions from different program threads may be stored within respective ones of the main storage elements. A thread identifying signal can be associated with the program instructions as they pass along the pipeline to control which storage element is used to store the signal values for those program instructions if desired.

Viewed from another aspect the present invention provides apparatus for processing data comprising:

instruction processing pipeline means for processing program instructions and having a plurality of pipeline stages;

at least one error detector means coupled to a pipeline stage of said instruction processing pipeline means and responsive to at least one signal value within said pipeline stage for detecting a processing error associated with an erring program instruction within said pipeline stage; and error recovery means coupled to said at least one error detector means and responsive to detection of a processing error by said error detector means for initiating an error recovery operation; wherein said pipeline stage includes a first main storage element means and a second main storage element means for sampling a signal for respective program instructions at respective operational sampling points in an alternating sequence; and said error recovery operation includes replacing an incorrect signal value stored in one of said first main storage element means or said second main storage element means with a correct value subsequent to said operational sampling point while a signal value for a following program instruction remains stored in an other of said first main storage element means or said second main storage element means.

Viewed from a further aspect the present invention provides a method for processing data comprising:

processing program instructions in an instruction processing pipeline having a plurality of pipeline stages;

in response to at least one signal value within a pipeline stage of said instruction processing pipeline, detecting a processing error associated with an erring program instruction within said pipeline stage;

in response to detection of a processing error, initiating an error recovery operation;

sampling a signal with a pipeline stage for respective program instructions at respective operational sampling points in an alternating sequence using a first, main storage element and a second main storage element; and replacing an incorrect signal value stored in one of said first main storage element or said second main storage element with a correct value subsequent to said operational sampling point while a signal value for a following program instruction remains stored in an other of said first main storage element or said second main storage element.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
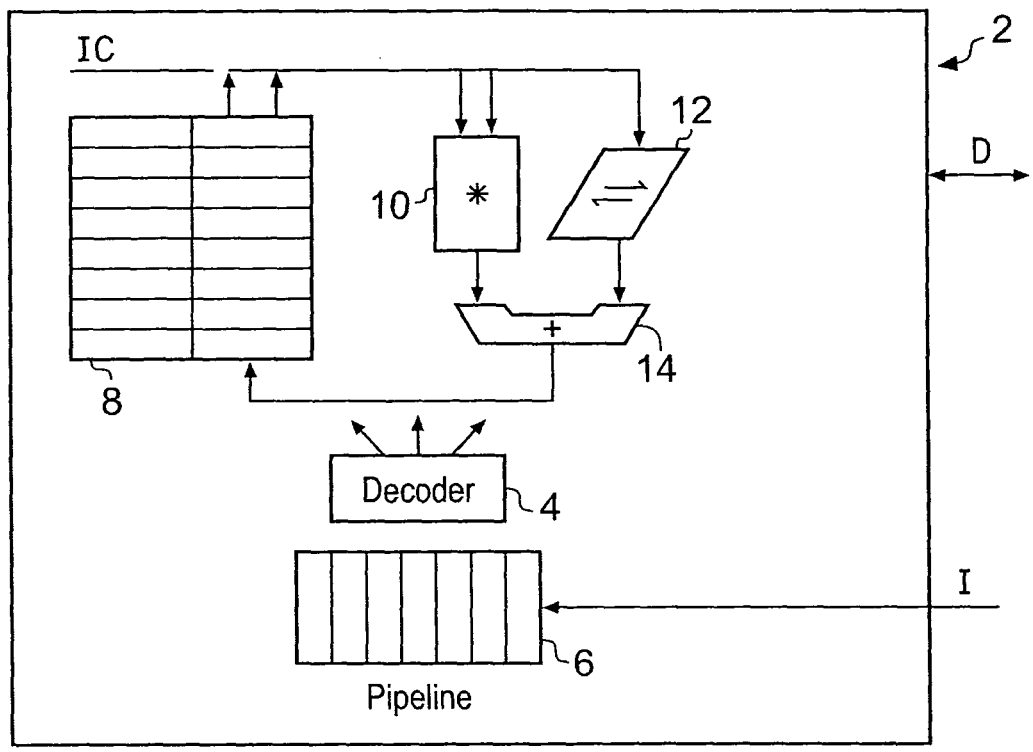
FIG. 1 schematically illustrates a data processing system having an instruction processing pipeline.

FIG. 1 schematically illustrates a data processing system in the form of an integrated circuit for performing data processing operations on data values D under control of a stream of program instructions I. The program instructions I are supplied to an instruction processing pipeline 6 containing a plurality of processing stages. One or more of these stages is a decode stage and an instruction decoder 4 is responsive to program instructions at that decode stage to generate control signals supplied to other portions of the data processing system 2 in order to control and configure them to perform the required data processing operations. Other elements of the data processing system 2 include a register bank 8, a multiplier 10, a shifter 12 and an adder 14. These data processing circuit elements 8, 10, 12, 14 are configured and controlled by the control signals from the decoder 4 to perform the data processing operations required by the program instructions as they are being passed along the instruction processing pipeline 6. It will be appreciated by those in this technical field that the data processing system 2 will typically contain many more circuit elements, such as cache memories, input/output circuitry and the like.

Figure 2:
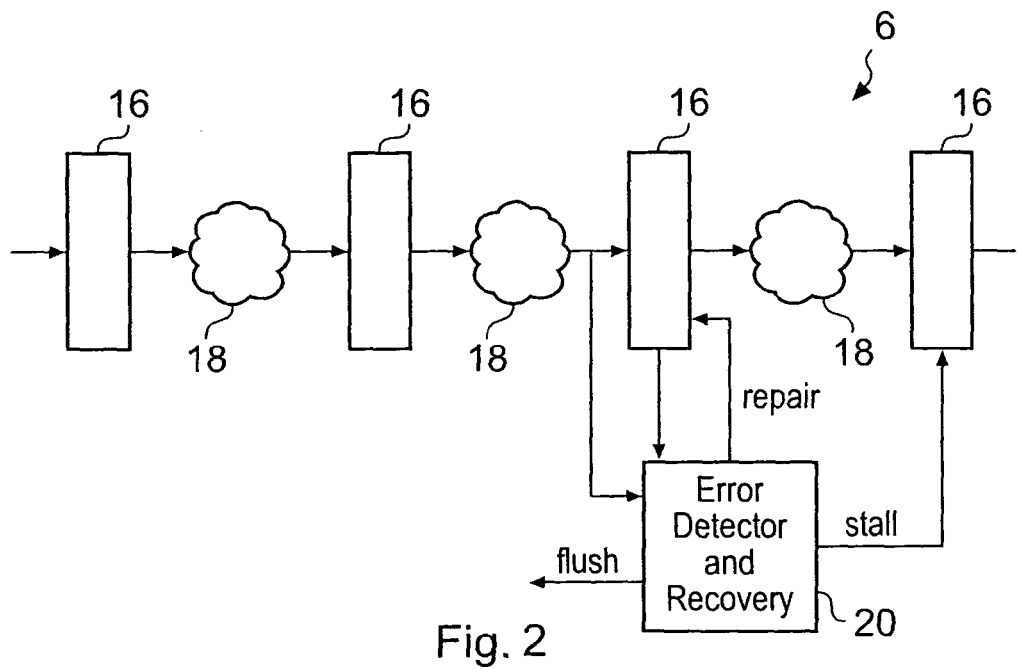
FIG. 2 illustrates in schematic form an instruction processing pipeline with error detection and recovery circuitry.

FIG. 2 schematically illustrates a portion of an instruction processing pipeline 6 comprising a plurality of storage elements 16 having respective processing logic 18 disposed therebetween. In operation, signal values are stored within a storage element 16 under control of a clock signal and then released for processing in the subsequent processing logic 18 at a given point in the clock cycle before being captured having been subject to the desired processing within the following storage element 16. It will be appreciated that in practice the processing logic 18 will typically receive inputs from many different storage elements 16 and may generate multiple outputs to be stored within respective storage elements 16.

Associated with one of the storage elements 18 illustrated in FIG. 2 is error detection and recovery circuitry 20 (this could be provided for all storage elements). When a signal value is stored within the associated storage element 16, that signal value is sampled at a later time by the error detector and recovery circuitry 20 and a determination is made as to whether or not there has been a change in the signal value compared with when it was stored within the storage element 16. If the signal value has changed (i.e. a late transition) then this indicates that the signal value stored within the storage element 16 was erroneous. Unfortunately, this erroneous signal value will already have been speculatively passed on to the subsequent processing stage and be "in-flight" in the subsequent processing logic 18. The error detector and recovery circuitry 20 deals with this by issuing a stall signal to the subsequent processing stage to inhibit further processing (or at least storage of the results thereof) based upon the erroneous signal. The erroneous signal may be corrected within the storage element 16 where it was originally incorrectly captured. In addition, any necessary flush operations within the instruction processing pipeline 6 can be initiated by a flush signal. For example, it may be that error recovery comprises suppressing further processing based upon the erroneous signal, flushing the erring instruction and all upstream instructions within the instruction processing pipeline, and then reloading the instruction processing pipeline 6 starting from the erring instruction and attempting to re-execute that erring instruction and all following instructions.

Figure 3:
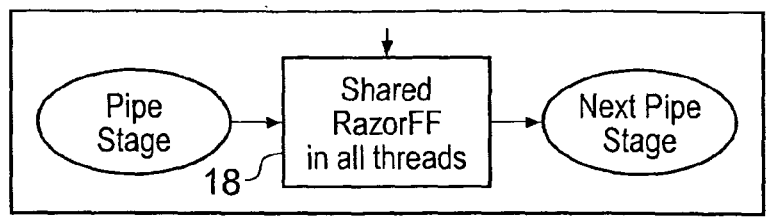
FIG. 3 schematically illustrates a pipeline stage with error detection and recovery logic.

FIG. 3 schematically illustrates a single pipeline stage within an instruction processing pipeline. In this example the storage element 18 is shared by all the program instructions passing along the instruction processing pipeline 16. Accordingly, if the instructions being supplied to the instruction processing pipeline are from multiple program threads (which may be controlled at a variety of levels), then these will use the same storage element 18 when they reach that pipeline stage.

Figure 4:
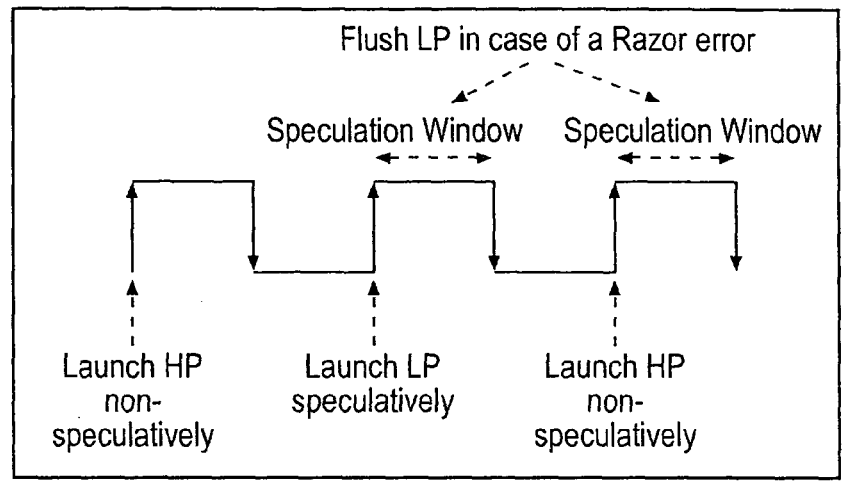
FIG. 4 is a timing diagram illustrating the speculation window associated with executing instructions.

FIG. 4 is a diagram schematically illustrating a clock signal for controlling the instruction processing pipeline 6 in FIG. 1. As illustrated, instructions are launched into the processing logic 18 in FIG. 2 at the rising edge of the clock signal. They are captured in the next storage element at the next rising edge. Following their capture at the next storage element, there starts a speculation window during which transitions within the captured signal are detected and identified as indicating an error in the previously captured signal. In the illustration, this speculation window lasts for half a cycle. This half cycle speculation window constrains the minimum processing delay which the processing logic 18 within each pipeline stage must have in order that a signal value resulting from evaluation of a following signal will not cause a transition which is incorrectly interpreted as indicative of an error in the preceding signal value. In the example shown in FIG. 4, the instructions are deemed to belong to two processing threads, namely a high priority thread and a low priority thread. Instructions from these respective threads are launched in an interleaved/alternating sequence into the instruction processing pipeline 6 on respective rising edges of the clock signal.

Figure 5A:
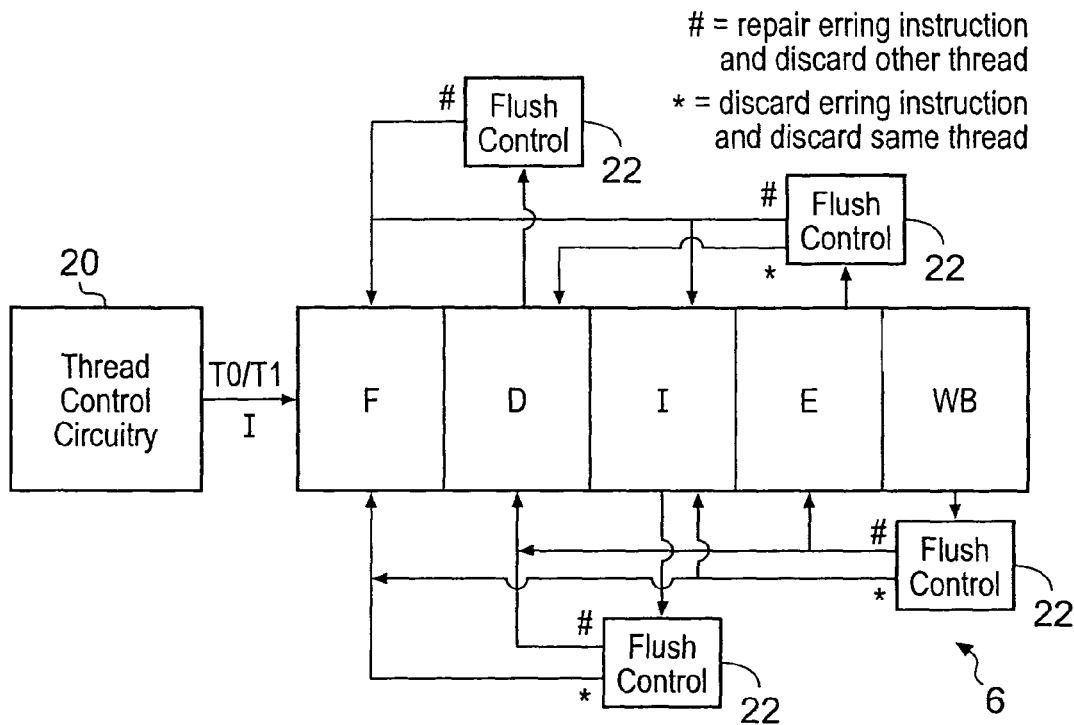
FIGS. 5A and 5B illustrate circuitry for flushing program instructions from a program instruction pipeline upon error detection.

FIG. 5A illustrates a first example instruction processing pipeline 6 in accordance with one example of the present technique. Thread control circuitry 20 is responsible for supplying instructions from an alternating sequence of threads (namely threads T0 and T1 in this example). Thread control circuitry 20 for performing this function will be understood by those in this technical field as it can follow conventional multi-threading techniques in which the different threads are identified at different levels within the system and the supply of instructions into the instruction processing pipeline 6 controlled appropriately. It will be understood by those in this technical field that a wide variety of levels of sophistication is possible in the thread control circuitry 20 and it is, for example, possible to use more than two threads, use an irregular interleaved sequence, dynamically adjust the number of threads being used etc.

The instruction processing pipeline 6 in this example is a five stage pipeline having the stages of fetch, decode, issue, execute and writeback. Processing errors can occur in any of these pipeline stages. These processing errors are typically associated with operating a system too close to its limiting conditions, e.g. frequency, voltage etc. It is also possible that errors may occur in a data dependent fashion as a consequence of a particular state being encountered within the data processing system 2. It will be appreciated that the processing errors detected are not interrupts or flaws within the programming, but are hardware related processing errors within the physical signal values.

Associated with each pipeline stage is flush control circuitry 22. This flush control circuitry 22 is responsive of an error within its associated pipeline stage to generate signals flushing upstream instructions from the instruction processing pipeline 6. There are two possible options for the flushing assuming a sequence of instructions from alternating threads. These options are illustrated by the "#" and "*" symbols. In the case that the erring instruction is a low priority instruction (this can be determined from a thread identifying signal passed with the instructions along the instruction processing pipeline by the thread control circuitry 20), the flush control circuitry 22 opts to discard that erring low priority program instruction itself and the other program instructions from that same thread, i.e. the low priority thread. Alternatively, if the erring instruction is from the high priority thread, then the flush control circuitry 22 repairs the erring instruction (using a value from a shadow latch as will be discussed later) and discards the following instruction, which will be from the low priority thread. The other instructions from the low priority thread are also discarded at this time since one of the preceding low priority thread instructions will have been discarded and accordingly processing will have to be restarted from that discarded instruction.

It will be appreciated that whilst the example of FIG. 5A illustrates the possibility for both types of flushing, other embodiments may apply a single flushing option with the advantage that not all of the program instructions will need to be flushed from the instruction processing pipeline 6 and accordingly the penalty associated with error recovery will be reduced.

Figures 5B, 6:
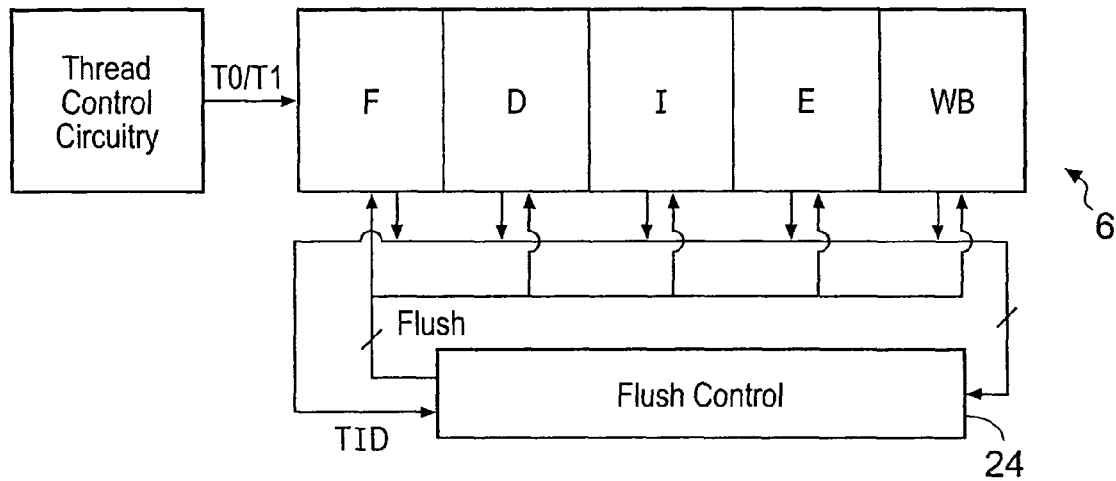
FIG. 6 illustrates which instructions from which threads are present within which pipeline stages during execution of program instructions within the instruction pipelines of FIGS. 5A and 5B.

FIG. 5B illustrates another example embodiment. In this example embodiment the flush control circuitry 24 is provided in the form of a common block shared by all of the pipeline stages. This flush control circuitry 24 receives signals indicative of the occurrence of a processing error within one of the pipeline stages and issues flush signals back to the pipeline stages to flush "in-flight" instructions from the appropriate ones of the pipeline stages selected for flushing.

FIG. 6 illustrates the instructions present within each of the pipeline stages of the instruction processing pipeline 6 at respective clock cycles. It will be seen that the thread from which the instructions are taken alternates as you pass along the instruction processing pipeline 6. Each pipeline stage during normal operation takes one cycle to perform its processing and accordingly the instructions progress in lockstep during normal non-erroneous operation.

Figure 7:
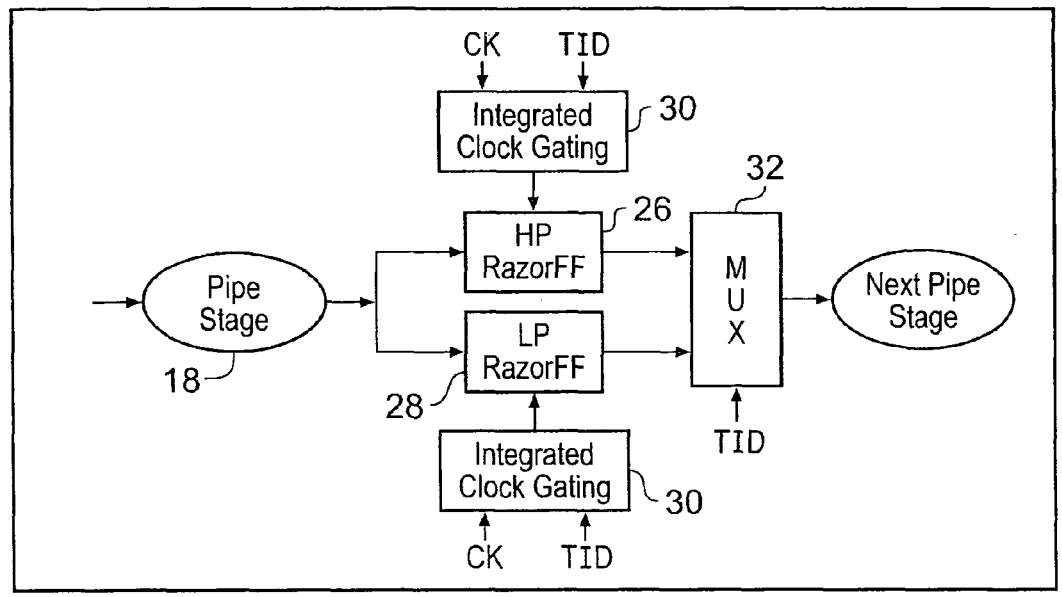
FIG. 7 illustrates a pipeline stage having two main storage elements.

FIG. 7 illustrates a further form of pipeline stage. This pipeline stage incorporates a first main storage element (in this example a flip-flop) 26 and a second main storage element 28. These are used in an alternating sequence under control of clock gating circuitry 30 to capture signal values from the processing logic 18. A multiplexer 32 selects one of the signal values within the first main storage element 26 and the second main storage element 28 to be passed to the next collection of processing logic downstream within the instruction processing pipeline 6. The clock gating circuitry 30 is responsive to the clock signal (as illustrated in FIG. 4)

together with a thread identifying signal (TID) to control respective ones of the first and second main storage elements 26, 28 to capture the signal values in an alternating sequence. When operating in this way, if a signal value captured within one of the main storage elements 26, 28 is in error and needs repairing, the other of the main storage elements 26, 28 will still be available to capture the signal value from the following program instruction, whilst the preceding signal value is being repaired during or at the end of its speculation window. The clock signal is stalled and the erring signal reissued into the following processing logic, but with this arrangement no program instructions need be lost and flushing of the instruction processing pipeline 6 can be avoided.

Figure 8:
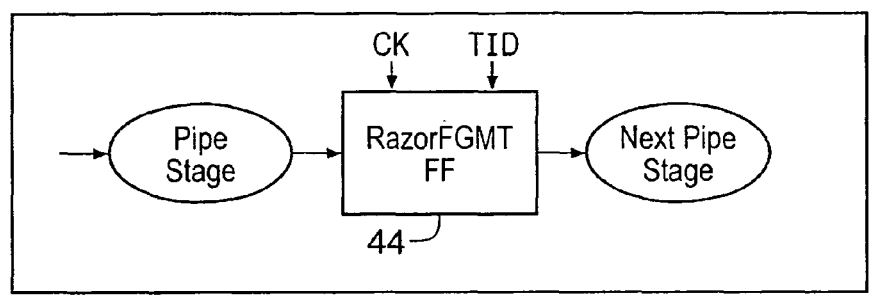
FIG. 8 schematically illustrates a pipeline stage having a thread aware storage element(s)

FIG. 8 schematically illustrates a storage element 44 associated with a pipeline stage and operating in accordance with the present techniques. This storage element 44 is "thread aware" and receives a thread identifying signal (TID) passed in lockstep with the program instructions along the processing pipeline. This permits the storage element 44 to use an appropriate main storage element when more than one main storage element is provided. Furthermore, it permits an appropriate selection of flushing strategy to be adopted when flushing is to be used as part of the recovery mechanism (e.g. when only one storage element is provided within the pipeline stage).

Figure 9:
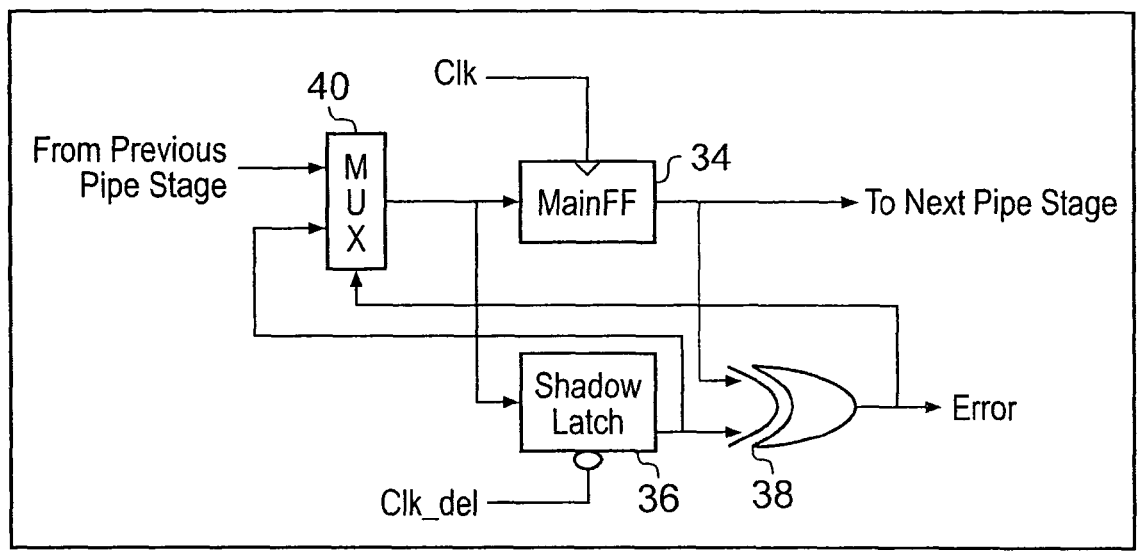
FIG. 9 illustrates error recovery circuitry associated with a storage element within an instruction pipeline stage.

FIG. 9 schematically illustrates error repairing circuitry (i.e. more details of the storage element 44 of FIG. 8). A signal value which may be in error (due to aggressive operation at high frequency or low voltage) is captured within a main storage element 34. This capture is performed under control of a main pipeline clock Clk. A delayed clock Clk_del is used to control capture at a later time by a shadow latch 36. In this way, the main storage element 34 captures the signal value at an operational sampling point and the shadow latch 36 captures the signal value (which may have changed if the preceding captured value was taken too early) at a point in time subsequent to the operational sampling point. The signal values captured by the main storage element 34 and the shadow latch 36 are compared by an XOR gate 38 and if they differ an error signal is generated. This error signal is supplied to the downstream logic to suppress processing performed on the basis of the erroneous signal already passed thereto and is also used to control a multiplexer 40 so as to supply the correct signal value from the shadow latch 36 into the main storage element 34 to repair the value stored therein.

Figure 10:
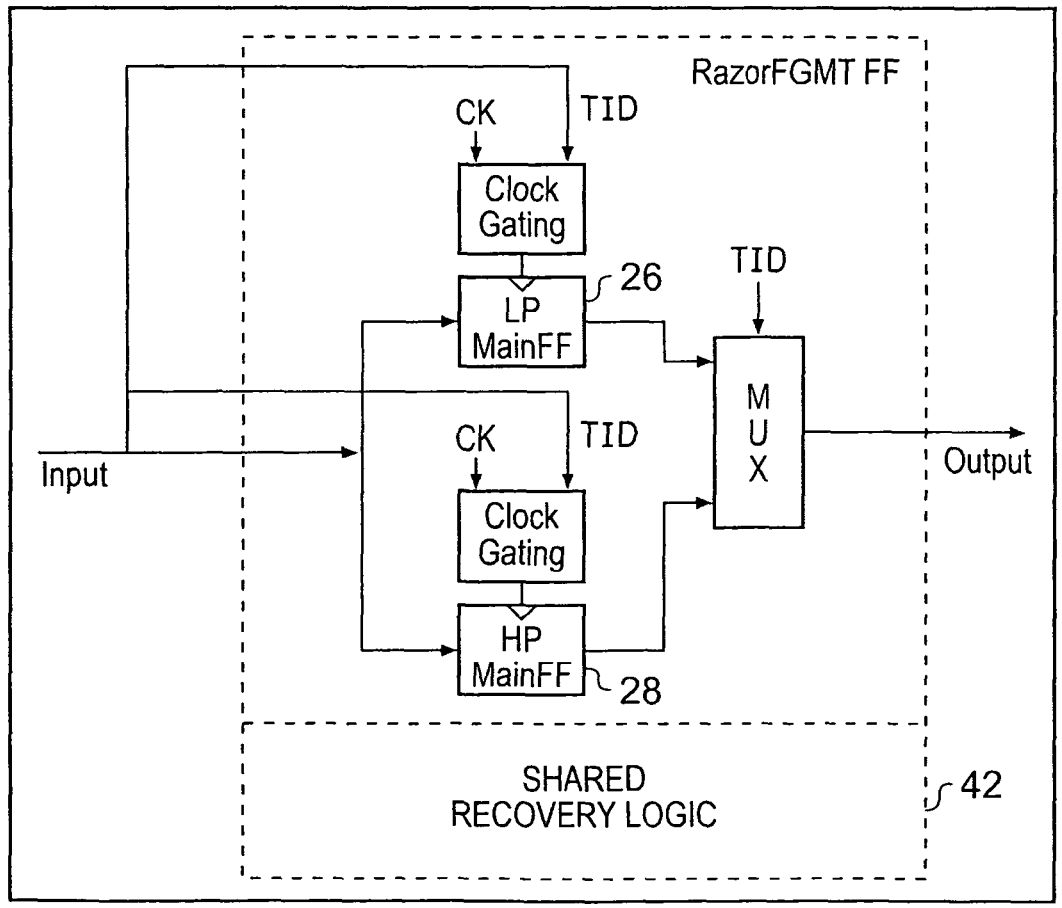
FIGS. 10 and 11 illustrate shared recovery circuitry associated with a pipeline stage having two main storage elements.
Figure 11:
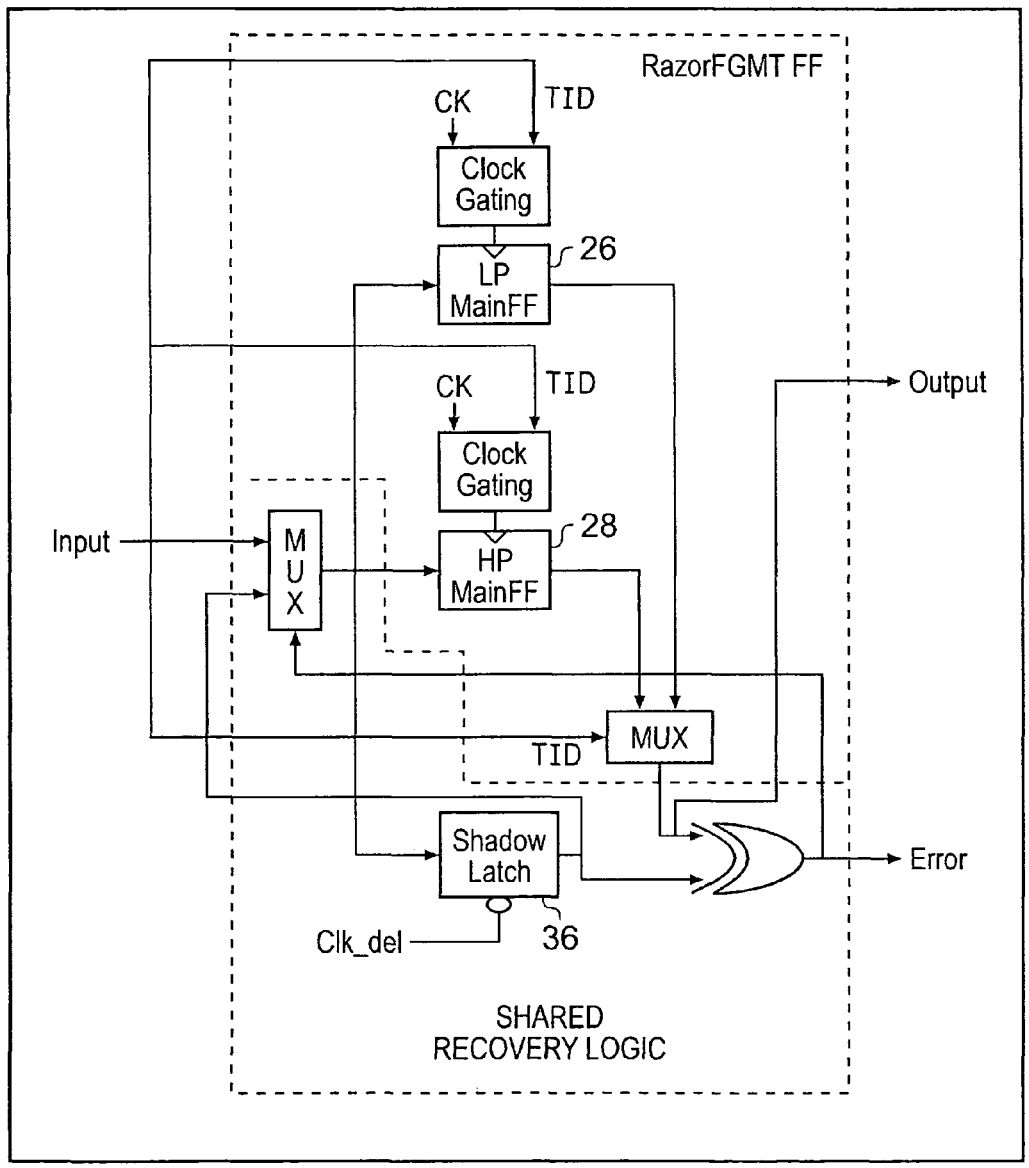

FIG. 10 illustrates the arrangement of FIG. 7 with two main storage elements, but in this case sharing recovery circuitry. It will be appreciated that each of the main storage elements is only operating at half the rate of the clock signal, but the shared recovery circuitry 42 is operating at the full clock rate and is shared between the two main storage elements 26, 28. This is illustrated in more detail in FIG. 11, in which the shadow latch of FIG. 8 has been integrated and shared by the two main storage elements 26, 28.

Figure 12:
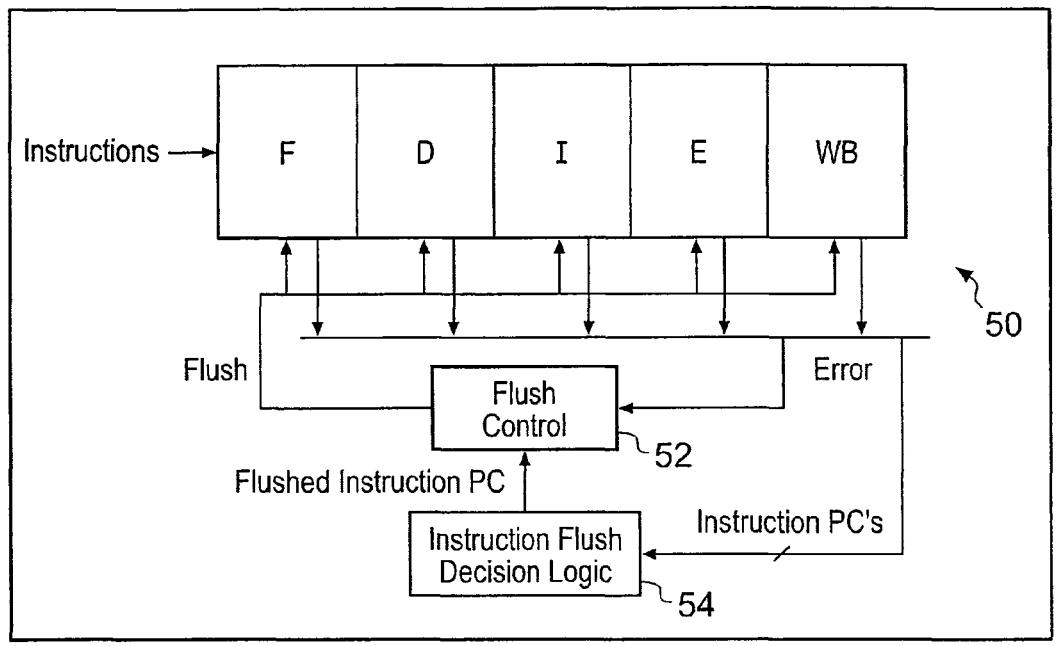
FIGS. 12 and 13 illustrate alternative circuitry for flushing program instructions from a program instruction pipeline upon error detection.

FIG. 12 illustrates another example embodiment of a processing pipeline 50 coupled to a flush controller 52. Instruction flush decision logic 54 is also coupled to the instruction pipeline 50 and receives an indication of the program counter value associated with each instruction within the pipeline together with an indication of which of those instructions is in error. The instruction flush decision logic 54 serves to select which of the instructions are to be flushed as a consequence of the error within the instruction pipeline 50. This selection can be made on the basis of many different metrics, such as the number of instructions dependent upon each candidate instruction to be flushed with the selection being made to flush the instruction which has the least number of dependents or a flush based upon instruction privilege level such that a user-level instruction will be flushed in preference to a supervisor-level instruction upon the assumption that the supervisor-level instruction will tend to be more critical to the operation of the system as a whole. When the instruction flush decision logic 54 has selected which instructions are to be flushed, then this is indicated back to the flush controller 52 which then initiates the flush operations in the appropriate stages of the pipeline 50. It will be appreciated that the mechanisms of FIG. 1 are generic and a wide variety of different metrics can be used to select which instructions are to be flushed when an error occurs. The metrics can be adjusted to the priorities of the particular system or implementation.

Figure 13:
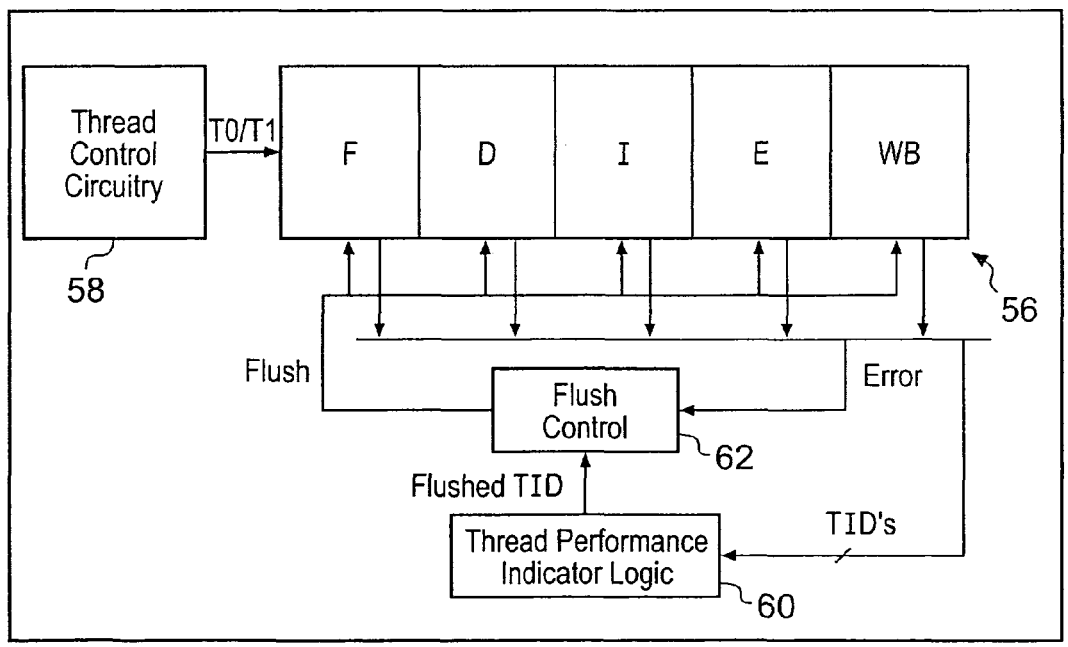

FIG. 13 illustrates a further example embodiment in which an instruction pipeline 56 is executing program instructions taken from two program threads T0 and T1 supplied to the instruction pipeline 56 from thread control circuitry 58. When an error occurs then this is notified to thread performance indicator logic 60 together with the thread identifiers TIDs of the various instructions within the instruction pipeline 56. The thread performance indicator logic 60 can then select which thread of instructions is to be flushed in order to support repair of the erring instruction in dependence upon a determination of the performance impact of flushing each thread. Thus, if one thread is performance critical and running close to its required deadline (e.g. is refreshing a frame memory for video support and is running at a level just managing to meet the required frame rate), then that thread will not be flushed and instead a less performance critical thread will be flushed to allow for error repair. When the thread performance indicator logic 60 has selected which thread is to be flushed, then this is indicated to the flush controller 62 which supplies the necessary flush signals to the instruction pipeline 56. It will be appreciated that the thread performance indicator logic 60 can derive its information regarding which threads are performance critical in a variety of different ways. One example would be for this performance information to be written to the thread performance indicator logic by the operating system under software control with the operating system effectively registering which threads are performance critical and accordingly should not be flushed if an alternative is available.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
an instruction processing pipeline having a plurality of pipeline stages;
at least one error detector, coupled to a pipeline stage of said instruction processing pipeline and responsive to at least one signal value within said pipeline stage, configured to detect a processing error associated with an erring program instruction within said pipeline stage;
error recovery circuitry, coupled to said at least one error detector and responsive to detection of a processing error by said error detector, configured to initiate an error recovery operation as a consequence of which at least one program instruction being processed in said instruction processing pipeline becomes a lost program instruction for which at least some state is lost and processing cannot continue, said error correction circuitry configured to (i) correct processing of said erring program instruction in place within said instruction processing pipeline such that a next following program instruction is said lost program instruction and (ii) discard said erring program instruction such that said erring program instruction is said lost program instruction; and a flush controller, coupled to said at least one error detector and responsive to detection of a processing error by said error detector, configured to selectively flush from said instruction processing pipeline one or more subsequent program instructions dependent upon said lost program instruction while program instructions independent of said lost program instruction are retained for further processing in said instruction processing pipeline, wherein said error recovery operation selects only one of (i) and (ii).

2. Apparatus as claimed in claim 1, wherein flush controller selects a victim program instruction to be said lost program instruction in dependence upon one or more characteristics of said victim program instruction.

3. Apparatus as claimed in claim 2, wherein said one or more characteristics include one or more of:
number of dependent instructions;
privilege level;
an opcode corresponding to a branch instruction; and
an opcode corresponding to a load instruction.

4. Apparatus as claimed in claim 1, comprising:
thread control circuitry coupled to said instruction processing pipeline and responsive to program instructions from a plurality of different program threads to control supply of an interleaved stream of program instructions from different program threads to said instruction processing pipeline; and wherein
said one or more subsequent program instructions flushed from said instruction processing pipeline are from a common program thread with said lost program instruction while said program instructions retained for further processing are of one or more other program threads.

5. Apparatus as claimed in claim 4, wherein said plurality of program threads share a priority level and said error recovery circuitry preferentially selects erring program instructions for error recovery such that said lost program instruction is from a thread having characteristics indicative of a low performance impact upon flushing said thread.

6. Apparatus as claimed in claim 4, wherein said plurality of program threads comprise a high priority program thread and a low priority program thread and said error recovery circuitry preferentially selects erring program instructions of said high priority program thread for error recovery such that a program instruction of said low priority program thread is said lost program instruction.

7. Apparatus as claimed in claim 6, wherein said thread control circuitry supplies program instructions from said high priority program thread and said low priority program thread in an alternating sequence.

8. Apparatus as claimed in claim 1, wherein said pipeline stage includes a main storage element for sampling a signal at an operational sampling point and said error detector includes a shadow storage element for sampling said signal value subsequent to said operational sampling point and a comparator for detecting any difference between values detected by said main storage element and said shadow storage element, a difference being indicative of said processing error.

9. Apparatus as claimed in claim 8, wherein a value sampled by said shadow storage element is used to replace an erroneous value with said main storage element as part of said error recovery operation.

10. Apparatus for processing data comprising:
instruction processing pipeline means for processing instructions and having a plurality of pipeline stages;
at least one error detector means for detecting a processing error associated with an erring program instruction within said pipeline stage, said error detection means is coupled to a pipeline stage of said instruction processing pipeline means and responsive to at least one signal value within said pipeline stage;
error recovery means for initiating an error recovery operation, said error recovery means is coupled to said at least one error detector means and responsive to detection of a processing error by said error detector means to initiate said error recovery operation as a consequence of which at least one program instruction being processed in said instruction processing pipeline means becomes a lost program instruction for which at least some state is lost and processing cannot continue said error correction means is configured to (i) correct processing of said erring program instruction in place within said instruction processing pipeline such that a next following program instruction is said lost program instruction and (ii) discard said erring program instruction such that said erring program instruction is said lost program instruction; and
flush controller means for controlling flushing, said flush controller means is coupled to said at least one error detector means and responsive to detection of a processing error by said error detector means to selectively flush from said instruction processing pipeline means one or more subsequent program instructions dependent upon said lost program instruction while program instructions independent of said lost program instruction are retained for further processing in said instruction processing pipeline means, wherein said error recovery operation selects only one of (i) and (ii).

11. A method for processing data comprising the steps of:
processing program instructions within an instruction processing pipeline having a plurality of pipeline stages;
in response to at least one signal value within a pipeline stage of said instruction processing pipeline, detecting a processing error associated with an erring program instruction within said pipeline stage;
in response to detection of said processing error, initiating an error recovery operation as a consequence of which at least one program instruction being processed in said instruction processing pipeline becomes a lost program instruction for which at least some state is lost and processing cannot continue; and
in response to detection of a processing error, selectively flushing from said instruction processing pipeline one or more subsequent program instructions from a common program thread with said lost program instruction while program instructions of one or more other program threads are retained for further processing in said instruction processing pipeline, wherein said error recovery operation selecting between (i) a step of correcting processing of said erring program instruction in place within said instruction processing pipeline such that a next following program instruction is said lost program instruction and (ii) a step of discarding said erring program instruction such that said erring program instruction is said lost program instruction.

12. A method as claimed in claim 11, comprising selecting a victim program instruction to be said lost program instruction in dependence upon one or more characteristics of said victim program instruction.

13. A method as claimed in claim 12, wherein said one or more characteristics include one or more of:
   number of dependent instructions;
   privilege level;
   an opcode corresponding to a branch instruction; and
   an opcode corresponding to a load instruction.

14. A method as claimed in claim 11, comprising:
   supplying of an interleaved stream of program instructions from different program threads to said instruction processing pipeline; and wherein
   said one or more subsequent program instructions flushed from said instruction processing pipeline are from a common program thread with said lost program instruction while said program instructions retained for further processing are of one or more other program threads.

15. A method as claimed in claim 14, wherein said plurality of program threads share a priority level and said error recovery operation preferentially selects erring program instructions for error recovery such that said lost program instruction is from a thread having characteristics indicative of a low performance impact upon flushing said thread.

16. A method as claimed in claim 11, wherein said plurality of program threads comprise a high priority program thread and a low priority program thread and said error recovery operation preferentially selects erring program instructions of said high priority program thread for error recovery such that a program instruction of said low priority program thread is said lost program instruction.

17. A method as claimed in claim 16, wherein program instructions from said high priority program thread and said low priority program thread are supplied in an alternating sequence.

18. A method as claimed in claim 11, wherein a main storage element in said pipeline stage samples a signal at an operational sampling point, a shadow storage element in an error detector samples said signal value subsequent to said operational sampling point and a comparator in said error detector detects any difference between values detected by said main storage element and said shadow storage element, a difference being indicative of said processing error.

19. A method as claimed in claim 18, wherein a value sampled by said shadow storage element is used to replace an erroneous value with said main storage element as part of said error recovery operation.

* * * * *